UNITED STATES PATENT OFFICE.

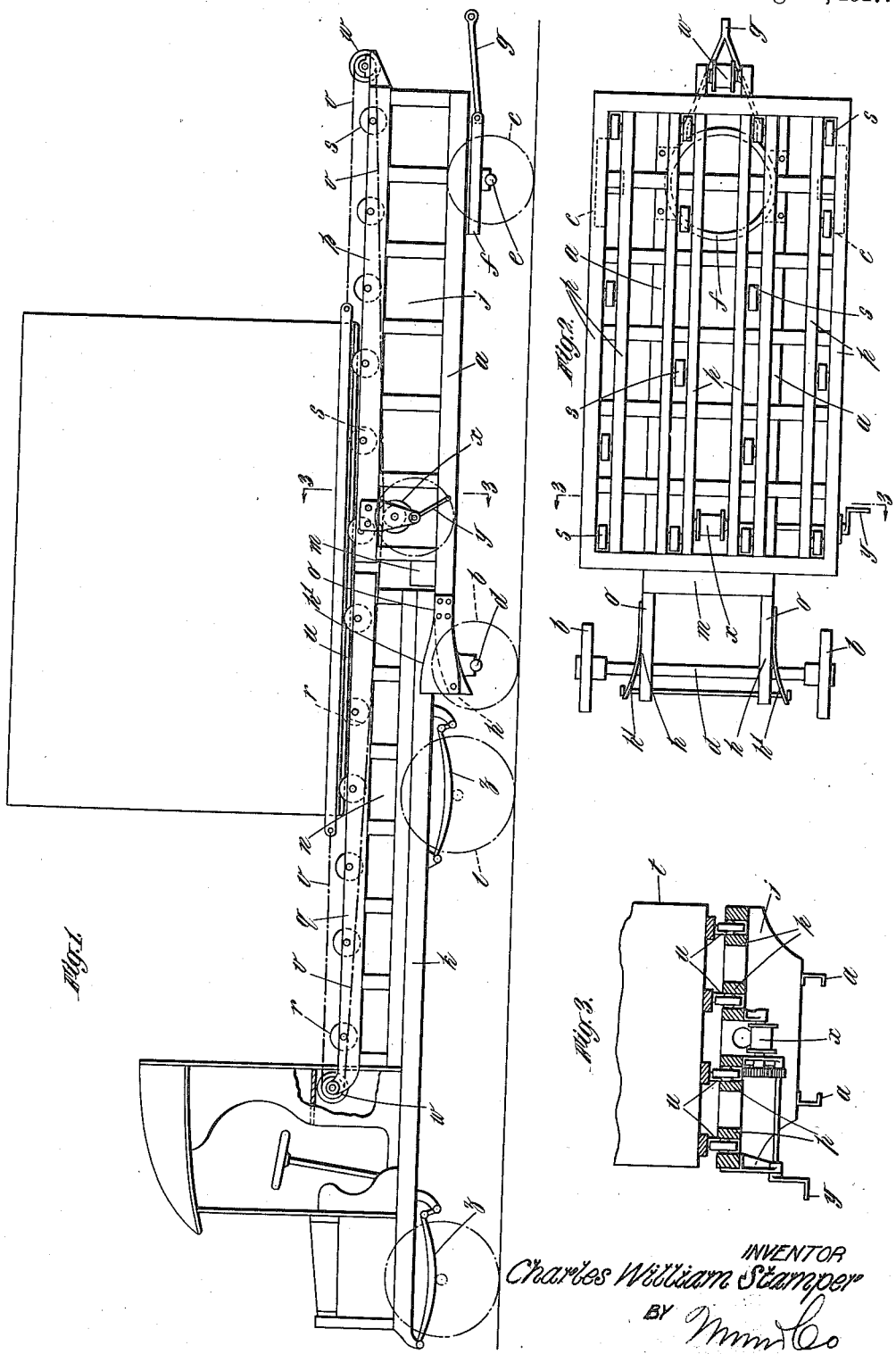

CHARLES WILLIAM STAMPER, OF LONDON, ENGLAND.

TRANSFER-LORRY.

1,237,834.　　　　　Specification of Letters Patent.　　Patented Aug. 21, 1917.

Application filed November 10, 1916. Serial No. 130,542.

*To all whom it may concern:*

Be it known that I, CHARLES WILLIAM STAMPER, a subject of the King of Great Britain, and resident of 4 & 8 Dover yard, Piccadilly, London, England, have invented certain new and useful Improvements in Transfer-Lorries, of which the following is a specification.

This invention relates to transfer lorries which are employed for transferring loaded or unloaded detachable vehicle-bodies and similar bulky articles to and from motor or other transport vehicles, and it has for its primary object to provide a lorry adapted to maintain the chassis (or corresponding part of the transport vehicle to which it is designed to serve as tender) at a predetermined level relatively to that of the chassis of the transfer lorry itself during the transferring operation, so as to enable the detachable vehicle-body or other article to be easily slid from the floor of the transport vehicle to the floor of the transfer lorry or vice versa; thus facilitating the handling and transport of heavy goods by permitting the use, with a single motor or other vehicle, of a plurality of detachable bodies one of which may be carried loaded during the loading or unloading of the other or others. A further object of the invention is to provide means for facilitating the transference of loads from one staging or vehicle to another.

The transfer lorry of the present invention consists of a permanently wheeled truck, having four wheels, but devoid of bearing springs, and provided with an end-extension adapted to engage beneath the chassis or corresponding part of the transport vehicle with which it is designed for use, said extension being so inclined to the horizontal as to cause the chassis of the transport vehicle to ride up to and be supported at a predetermined level relatively to that of the chassis of the lorry when the lorry and transport vehicle are backed one against the other.

This arrangement has for effect to relieve the bearing springs of the transport vehicle of their load during the transferring operation, and, as the floor of the transfer lorry would be placed at such a level as to extend, during use, in substantially the same plane as the floor of the transport vehicle itself, it follows that the detachable vehicle-body or other article to be moved can be readily slid on rollers from the lorry to the vehicle or vice versa, while the drawing apart of the lorry and transport vehicle after the latter has received its load will permit of the bearing-springs being gradually subjected to the full weight of the load.

In the accompanying drawings, Figure 1 is an elementary or diagrammatic side elevation showing one form of transfer lorry constructed in accordance with the present invention, together with a motor transport vehicle of well-known type, in their proper relative position for enabling the transferring operation to be carried out, a detachable vehicle-body being indicated in process of transference from one to the other. Fig. 2 is a plan view of the transfer lorry shown in Fig. 1, and Fig. 3 is a cross section of the transfer lorry on the line 3—3, Figs. 1 and 2, the wheels and certain other parts being omitted for the sake of clearness.

The chassis $a$ of the transfer lorry is supported by two pairs of wheels $b$ and $c$, whereof what may be termed the rear pair $b$ are on an axle $d$ attached to the chassis so as to be incapable of swiveling, while the front pair $c$ are on an axle $e$ attached to the rotatable member of a swiveling under-carriage or turntable $f$, the latter being furnished with a draw-bar $g$ for enabling the lorry to be moved as required, by horse-traction or other convenient means. The lorry is devoid of bearing-springs, so that its chassis remains at a constant height relatively to the ground level, and this height is made such that the upper surface of the chassis $a$ is on a level with (or very slightly higher than) the under-surface of the chassis $h$ of the transport vehicle to which the transfer lorry is designed to serve as tender, when said vehicle is unloaded.

The chassis $a$ of the transfer lorry extends, as shown at $h$, rearward beyond the frame $j$ of the lorry so as to be capable of taking under the rear portion of the chassis $k$ of the transport vehicle, which projects as usual some distance rearward of its rear wheels $l$; the extension $h$ being downwardly curved or inclined so as to pass freely beneath the chassis $k$ and permit of the latter riding up over the extension when the lorry and transport vehicle are backed against one another to the relative position indicated in Fig. 1, which position is determined by a stop or buffer m provided on the lorry behind the frame j thereof and adapted to be encountered by the rear end of the chassis k or frame n of the transport vehicle. The chassis a of the lorry is continued level for a short distance rearward of the stop m, as indicated at o, so as to afford a secure resting place for the chassis k of the transport vehicle when the lorry and said vehicle are fully backed together.

The frame j of the transfer lorry is a skeleton frame similar to the frame n of the transport vehicle, the construction in each case being similar to that usually employed in vehicles having detachable bodies, and the upper members p of the frame j (constituting in effect the floor of the lorry) are placed at such a height above the chassis a as to extend at substantially the same level as the upper members q of the frame n (constituting in effect the floor of the transport vehicle) when the lorry and transport vehicle are backed together. The upper members q of the transport vehicle frame n carry, as usual, a series of rollers r, and the upper members p of the lorry frame j carry a similar series of rollers s, so that the detachable body t of the transport vehicle (which is provided with guide-rails u as indicated) can be slid with the minimum amount of frictional resistance from the vehicle to the lorry or vice versa, as required.

The transferring operation may be effected by means of a windlass device. In the example illustrated, a chain or cord v, fastened by its ends to the opposite ends of the detachable vehicle-body t, is led around guide pulleys w mounted respectively at the front of the transport vehicle frame n and at the rear of the transfer lorry frame j, and is coiled around a drum x on the frame n, this drum being adapted to be rotated through suitable gearing by means of a crank-handle y.

The rear axle d of the transfer lorry is placed immediately beneath the chassis-extension h so as to be adapted to support the latter securely when the chassis k of the transport vehicle rests thereon during the transferring operation. In order to guide the chassis k into proper position upon the extension h, this extension is provided with lateral guides h' which, extending at either side of the chassis extension h, are rearwardly flared as indicated in Fig. 2.

Assuming the detachable vehicle-body t, Fig. 1, to have been packed or loaded while resting upon the rollers s of the transfer lorry, it will be seen that by rotating the crank-handle y in the appropriate direction, the vehicle-body t can be transferred to position on the rollers r of the transport vehicle. Moreover, so long as the transport vehicle remains backed against the transfer lorry, the bearing springs z of the transport vehicle will be to a great extent relieved of the load, which will be imposed upon the springs z only as and when the transport vehicle and lorry are drawn apart.

It will be obvious that the detachable vehicle-body may be of any form suited to the nature of the load to be carried, and that bulky and heavy articles, such as large packing cases for example, can be dealt with in substantially the same manner as that described above.

What I claim is:—

A transfer lorry for use in transferring detachable vehicle bodies and similar bulky articles to and from a transport vehicle, comprising a chassis adapted to permit of the load being slid over its upper surface in the fore and aft direction, longitudinal side members on said chassis having rearward extensions for taking under and supporting the rear portion of the chassis of the transport vehicle, the terminal portions of said extensions being downwardly inclined, a pair of lateral guides for the chassis of the transport vehicle, attached to said extensions, and front and rear pairs of wheels for the lorry, said extensions being rigidly supported from the rear pair of said wheels.

CHARLES WILLIAM STAMPER.